United States Patent [19]
Szymber et al.

[11] 3,813,155
[45] May 28, 1974

[54] AUTOMATIC FOCUSING SYSTEM FOR PROJECTORS AND THE LIKE

[75] Inventors: Oleg Szymber, Elk Grove; Norman Shim, Glenview, both of Ill.

[73] Assignee: GAF Corporation, New York, N.Y.

[22] Filed: May 15, 1972

[21] Appl. No.: 253,497

Related U.S. Application Data

[63] Continuation-in-part of Ser. No. 72,076, Sept. 14, 1970, Pat. No. 3,672,757.

[52] U.S. Cl. ............................................... 353/101
[51] Int. Cl. ............................................. G03b 3/10
[58] Field of Search ............... 353/69, 101; 352/140

[56] References Cited
UNITED STATES PATENTS

| | | | |
|---|---|---|---|
| 3,249,006 | 5/1966 | Stauffer | 353/101 |
| 3,264,935 | 8/1966 | Vose | 353/101 |
| 3,628,857 | 12/1971 | Harvey | 353/101 |
| 3,639,048 | 2/1972 | Heaney | 353/101 |

Primary Examiner—Harry N. Haroian
Attorney, Agent, or Firm—Walter C. Kehm; Samson B. Leavitt

[57] ABSTRACT

In a first appraisal subsystem wave energy from a first source is directed to a first detection means along paths which include the wave energy being reflected by a remote screen to sense variations in the distance between the projector objective lens and the screen. In a second appraisal subsystem wave energy from a second source is directed to a second detection means by reflecting the same from a transparency to sense buckling of the transparency. Displacement of the screen, objective lens or the transparency causes the first and second detection means to generate electrical pulses which are out of time phase with respect to each other. A control circuit receives the electrical pulses from the first and second detection means and produces a control signal representing the time differential therebetween. Motive means operated by the control circuit and responsive to the control signal axially moves the objective lens to establish focus of the screen image and bring the pulses from the two detection means into phase.

17 Claims, 5 Drawing Figures

3,813,155

AUTOMATIC FOCUSING SYSTEM FOR PROJECTORS AND THE LIKE

This application is a continuation-in-part of our co-pending application, Ser. No. 72,076 filed Sept. 14, 1970 now U.S. Pat. No. 3,672,757.

BACKGROUND OF THE INVENTION

Slide projectors have been introduced onto the market in recent years equipped with so-called automatic focusing devices. These devices are based on the automatic focusing system shown in U. S. Pat. No. 3,037,423 to Shurcliff. According to the Shurcliff patent, a beam of light in an appraisal subsystem is directed to a slide transparency disposed within the projector gate and is reflected to a pair of photoelectric cells. Displacement of the transparency in the gate as a result of buckling, for example, will cause one photoelectric cell to be illuminated to a degree greater than the other cell. This unbalanced condition generates an electrical signal which actuates motive means for moving the objective lens to re-establish focusing. The lens element forming part of the appraisal subsystem also moves with the objective lens thereby to re-balance the appraisal subsystem for deactivating the photoelectric cells when focus is established. Additional patents representing such prior art systems are: U. S. Pat. No. 2,947,215 to Mitchell, U. S. Pat. No. 3,205,744 to Ewald, et al. and U. S. Pat. No. 3,249,001 to Stauffer.

The prior art systems disclosed in these patents are not actually automatic focusing systems in the true sense of the term, since they each require that initial focus be established by manual movement of the objective lens. These systems are more properly characterized as systems for maintaining a preset distance between the slide transparency and the objective lens, since they merely compensate for displacement of the slide transparency. That is to say, these systems will not compensate for the transparency image being out of focus due to displacement of the screen or objective lens, for example.

In the recently issued U. S. Pat. No. 3,635,551 to Oleg Szymber, assigned to the assignee of this application, a fully automatic focusing system is disclosed and claimed. According to the Szymber system, a beam of light is directed from its source to detection means along paths which are defined in part by the beam of light being reflected from the transparency and from the screen. Displacement of any one of the screen, objective lens or transparency will cause displacement of the beam of light with respect to the detection means and thereby activate the latter to generate an electrical signal. Motive means controlled by the detection means is operative to move the objective lens to establish focus of the transparency and to reposition the beam of wave energy on the detection means. Unlike the prior systems, the Szymber system does not require that initial focus be established manually. In addition, the Szymber system is fully automatic and will not only establish focus initially, but will maintain focus throughout a projection sequence.

The co-pending parent application, Ser. No. 72,076, is directed to the type of fully automatic system shown in the Szymber patent, and embodies several improvements over such system. To avoid excessive loss of intensity of the beam of light by reflecting the same from both the screen and the transparency before it reaches the detection means, the automatic focusing system of the parent application includes a first appraisal subsystem for detecting variations in the distances of a light source and the screen from a focusing lens and for moving the latter and the objective lens in response to such variations, and a second appraisal subsystem for detecting buckling or popping of the transparency and in response thereto for moving such light source. By utilizing separate but interrelated light beams in the first and second appraisal subsystems, the efficiency of the system is greatly improved.

The present invention is directed to a further improvement in the fully automatic focusing system of Szymber.

SUMMARY OF THE INVENTION

In accordance with the present invention, an improved automatic focusing system of the type utilizing first and second appraisal subsystems to detect variations in the distances between the objective lens of the projector and the screen, and the transparency and the objective lens, respectively, is provided. The improvement resides in the fact that, rather than depending upon the displacement of one or more beams of wave energy reflected from the screen and/or the transparency upon detection means to generate electrical signals to drive motive means to reposition the objective lens and thereby establish focus, the present invention utilizes a control circuit which is responsive to the time phase differential between the electrical pulses generated by the first and second detection means to produce a control signal, which operates the motive means to move the objective lens into a focusing position. The automatic focusing system of the invention is much simpler and more efficient than the prior systems described above. Since the control circuit in the present invention operates in response to a time differential between the pulses generated by the two detection cells, the intensity of the wave energy reflected from both the screen and the transparency is far less important than it has been in prior systems. Accordingly, the light sources in the two appraisal subsystems can be of a smaller size and lesser intensity than in the prior systems. In addition, the projector objective lens is utilized to focus the appraisal beam on the screen, whereas in the prior systems, additional lens elements were required.

In general, the automatic focusing system of the invention comprises, in combination, a first appraisal subsystem to sense variations in the distance between the projector objective lens and the screen including a first source of wave energy, means for directing a beam of wave energy from said first source to the projection screen, and first detection means positioned to receive the wave energy reflected from the screen and responsive thereto to generate a first electrical pulse; a second appraisal subsystem to sense buckling of the transparency including a second source of wave energy, means for directing a beam of wave energy from the second source to the transparency, and second detection means positioned to receive wave energy reflected from the transparency and responsive thereto to generate a second electrical pulse; control circuit means connected to said first and second detection means and adapted to produce a control signal representing the time phase differential between the first and second electrical pulses; and motive means operated by the control circuit means and responsive to the control signals to axially move the projector objective lens to establish focus of the screen image and bring the pulses from the two detection means into time phase.

The means for directing the wave energy in both appraisal subsystems from their sources to the respective detection means comprises a two-sided reflector which is interposed in the projector between the first and second sources of wave energy. Wave energy from the first source strikes one side of the reflector and is projected via the objective lens to the screen. Wave energy from the second source is reflected by the second side of the reflector to the transparency. Both sources of wave energy are disposed in the same plane, so that the beams reflected from both sides of the reflector at any given instant are in axial alignment with each other regardless of the angular position of the reflector with respect to the two wave energy sources.

The reflector is connected to oscillating means which vibrates or rotates the reflector at a high frequency so as to cyclically change its angle with respect to the two sources of wave energy. In this manner, the wave energy reflected by both sides of the oscillating reflector forms light patterns in the form of a straight line or bar on both the screen and the transparency, which is reflected thereby to the respective detection means of the first and second appraisal subsystems. However, the nature and the position of the detection means are such that they receive only one point or segment of light reflected by the screen and the transparency, rather than the entire pattern during each oscillation of the reflector. The balance of the reflected light is scattered and does not focus upon the detection means. It follows, therefore, that if the screen or the objective lens is moved, the first detection means will receive wave energy reflected from a different point on the screen pattern. Likewise, if the transparency is moved or buckles within the gate or if the objective lens is moved, the second detection means will receive wave energy reflected from a different point on the transparency pattern. The two detection means are mounted for movement with the objective lens at a fixed angle with respect to the optical axis. Accordingly, at the instant reflected wave energy reaches the particular detection means after movement of the transparency, the objective lens or the screen, the oscillating reflector must necessarily be in an angular position different from that prior to the movement of one of the above-mentioned components. This means that the wave energy reflected from the moved component will reach the detection means in its respective appraisal subsystem out of time phase with the wave energy reflected to the detection means in the other appraisal subsystem, because there is a finite time differential between the position of the reflector when wave energy reaches the first detection means from the screen, and the position of the reflector when the wave energy reaches the second detection means from the transparency. Therefore, in this condition, which represents the out-of-focus condition caused by moving one of the above-mentioned components, the electrical pulses generated by the first and second detection means will be out of time phase with each other.

The control circuit means, which receives the electrical pulses from the detection means, produces output control signals representing the time differential between each pair of pulses received from the two detection means during each cycle of the oscillating reflector. These control signals operate the motive means to move the objective lens and the two detection cells either in a forward or reverse direction along the optical axis, depending upon which detection means generates the first pulse during each cycle of the reflector, so as to re-focus or initially focus the projector and reposition the beams of wave energy in the first and second appraisal subsystems so that they are in time phase with each other.

The detection means utilized in the first and second appraisal subsystems can be simply conventional photosensitive cells responsive to light of all or a particular wave length and adapted to produce electrical signals corresponding in current magnitude to the intensity of the light reflected thereupon. It is desirable that both photocells produce signals of like intensity in any given position of the screen, the objective lens or the transparency. To accomplish this, the reflective characteristics of the screen and of the transparency and the distances between the wave energy sources and these components should be taken into consideration in choosing sources of wave energy, so that the intensity of the reflected light received by both photocells is essentially the same. As an alternative approach, the photocells themselves can be sized, taking into consideration the amount of light reflected from the screen and transparency, so as to produce substantially equal electrical output pulses.

As a preferred alternative, the control circuit itself can be adapted to be responsive only to the absolute time phase differential between the pulses regardless of their respective magnitudes. In this manner, it is important only that the photocells receive sufficient light to generate a pulse of any magnitude.

The control circuit includes a pair of bistable multivibrators, commonly known as electric flip-flops, each adapted to receive the pulses generated by one of the photocells. The flip-flops change from one stable state (on) to the other stable state (off) upon the application of a maximum input signal from each respective photocell. The output of the flip-flops is integrated by a conventional RC network and compared by a differential amplifier, which also forms a part of the control circuit. The DC level of each flip-flop output is determined by the on/off time ratio. In this manner, the output of the differential amplifier will be other than zero if the ratios from each flip-flop are not equal. The control signal produced by the differential amplifier will be either positive or negative depending upon the integrated DC levels of the two flip-flop outputs. The control signal is boosted by a motive means to drive the objective lens in either a forward or reverse direction, depending upon the signal polarity, along the optical axis. If the pulses from the two photocells are received simultaneously by the two flip-flops, indicating that the projector is in focus, they tend to cancel each other out, so that no control signal is produced by the differential amplifer, and the lens remains in the same position.

The automatic focusing system of the invention and the various features thereof are further described with reference to the embodiments shown in the accompanying drawings.

DETAILED DESCRIPTION OF THE PREFERRED EMBODIMENTS

For purposes of illustration, the present invention is shown and described as embodied in a photographic slide projector. However, it will be understood by those skilled in the art that the invention is not to be limited for use with such slide projectors, and may be utilized with other projection devices, such as moving picture projectors, for example.

Figure 1:
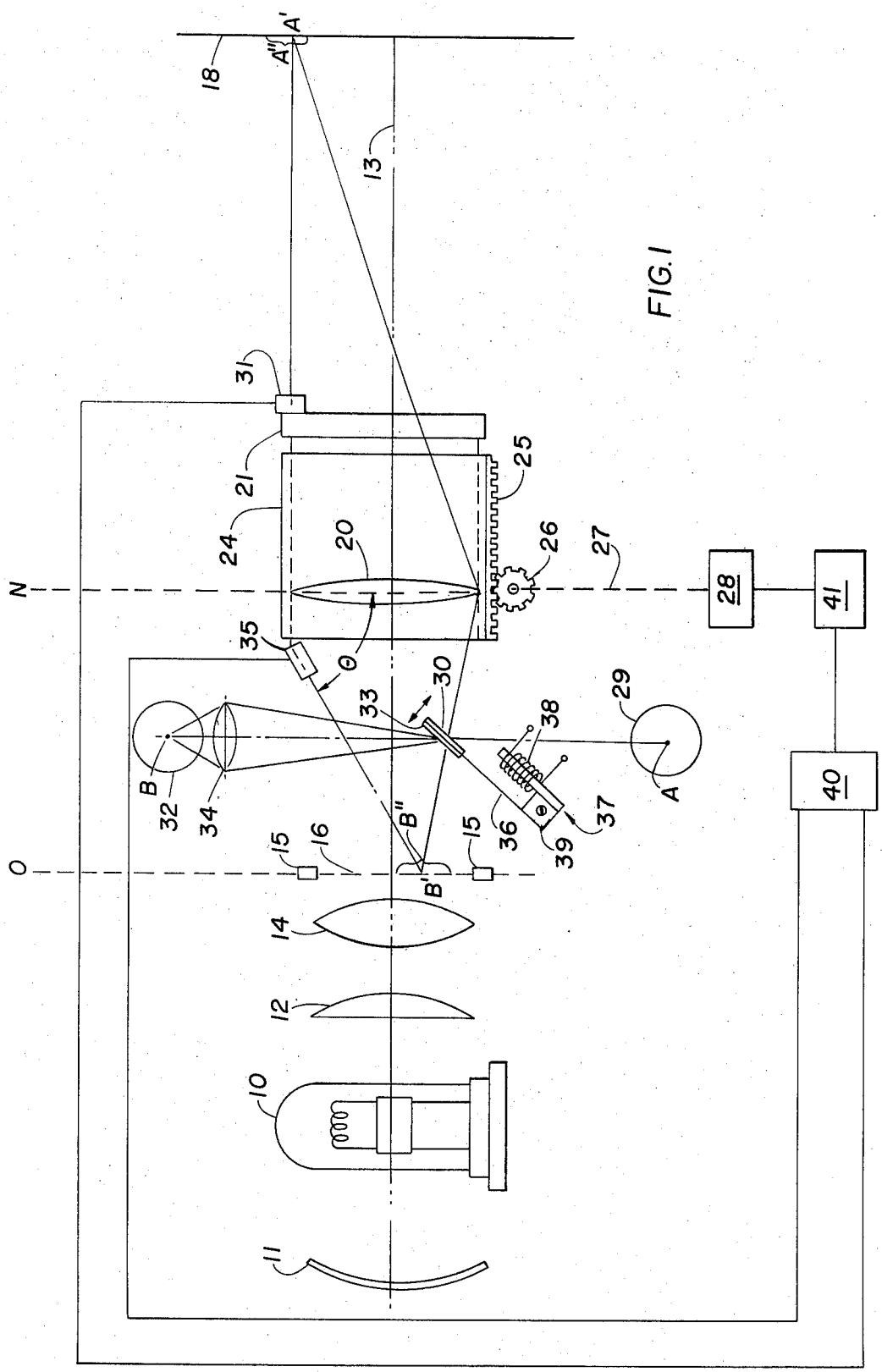
FIG. 1 is a side elevation view, largely diagrammatic, showing the various components of the automatic focusing system of the invention as embodied in a conventional slide projector.

Referring to FIG. 1, the conventional components of a photographic slide projector of any suitable type are seen to include a projection bulb 10 mounted between a reflector 11 and a lens 12 for projecting light along the projector optical axis 13. Another lens 14 includes the usual heat filter for removing infra-red energy to cool the radiation used for projection.

Slide positioning elements in the form of a pair of rails 15 define the projection gate and slidably receive a slide transparency 16 for holding the same in a plane O perpendicular to the optical axis 13. In FIG. 1, the slide transparency 16 is shown in an unbuckled or unpopped configuration. An objective lens 20 is mounted in a barrel 21, the latter being mounted for reciprocal movement parallel to and along with the optical axis for focusing the transparency image on a remote screen 18. The lens barrel 21 may be mounted for sliding movement within a sleeve 24 and manually operated means (not shown) may be provided to move the barrel 21 relative to the sleeve 24 to achieve manual focusing, if desired. The sleeve 24, which is mounted for axial reciprocal movement by any suitable means (not shown), carries an axially extending gear rack 25 in meshing engagement with a pinion gear 26, the latter being driven by a shaft 27 in turn driven from a reversible electric servo motor 28. It will be understood that movement of the sleeve 24 imparts corresponding movement to the lens barrel 21, but the latter may be moved relative to the former to achieve manual focusing as mentioned above. It should be apparent that upon energization of the motor 28, the lens 20 will be moved along the optical axis in one direction or the other, depending on the direction of rotation of the motor 28, to achieve focusing.

As shown in FIG. 1 the automatic focusing system of the invention comprises a first appraisal subsystem for sensing variations in the distance between the objective lens 20 and the screen 18, which includes a first source of wave energy or radiation such as an incandescent bulb 29, having its filament defining a point A, and a reflector in the form of a mirror 30 adapted for directing a beam of light emitted from the bulb 29 to a point A' on the screen 18 via objective lens 20. Also included in the first appraisal subsystem is a first detection means comprising a photoelectric cell 31 fixedly mounted on the sleeve 24 for movement therewith; the photocell 31 being positioned to receive the light reflected from the screen at point A' and to thereupon generate a first electrical pulse.

A second appraisal subsystem is provided to sense buckling or popping of the transparency 16 which causes the projected image on the screen 18 to be out of focus. This appraisal subsystem also includes a source of wave energy in the form of an incandescent bulb 32, the filament of which defines a point B. A mirror 33, positioned on the reverse side of mirror 31, is disposed to intercept the light beams emitted from bulb 32 and reflect the same to point B' on the transparency 16. A lens 34 is interposed between the bulb 32 and the mirror 33 so as to effectuate focus of the reflected light beam upon the slide 16. Second detection means comprising a photoelectric cell 35, which is also fixedly mounted on sleeve 24, is adapted to receive light reflected from point B' on the slide 16. Illumination of photocell 35 by the light beam reflected from slide 16 causes the said photocell to generate a second electrical pulse.

It will be understood that the objective lens 20 and the photocells 31 and 35 are mounted on the sleeve 24 for movement along the optical axis therewith by the rotation of the pinion gear 26 upon energization of the reversible electric servo motor 28.

Both light sources 29 and 32 are disposed in the same plane. Similarly, the mirrors 30 and 33 are disposed in parallel planes which intersect the plane of the light sources, so that the beams reflected by both mirrors at any given instant are in axial alignment with each other, as shown in FIG. 1, regardless of the angular position of the mirrors with respect to the light sources. The mirrors 30 and 33 are fixedly attached to an arm 36 of an electromagnetic oscillator 37. The oscillator comprises a coil 38 and a bracket 39 for mounting the arm 36 thereon, and is adapted to vibrate the mirrors 30 and 33 at a high frequency so as to cyclically change their angle with respect to the two light sources 29 and 32. The vibration frequencies should be sufficiently high so that the beams of light reflected by the oscillating mirrors define light patterns in the form of a straight line or bar designated A'' and B'' on screen 18 and the transparency 16, respectively.

Figure 2:
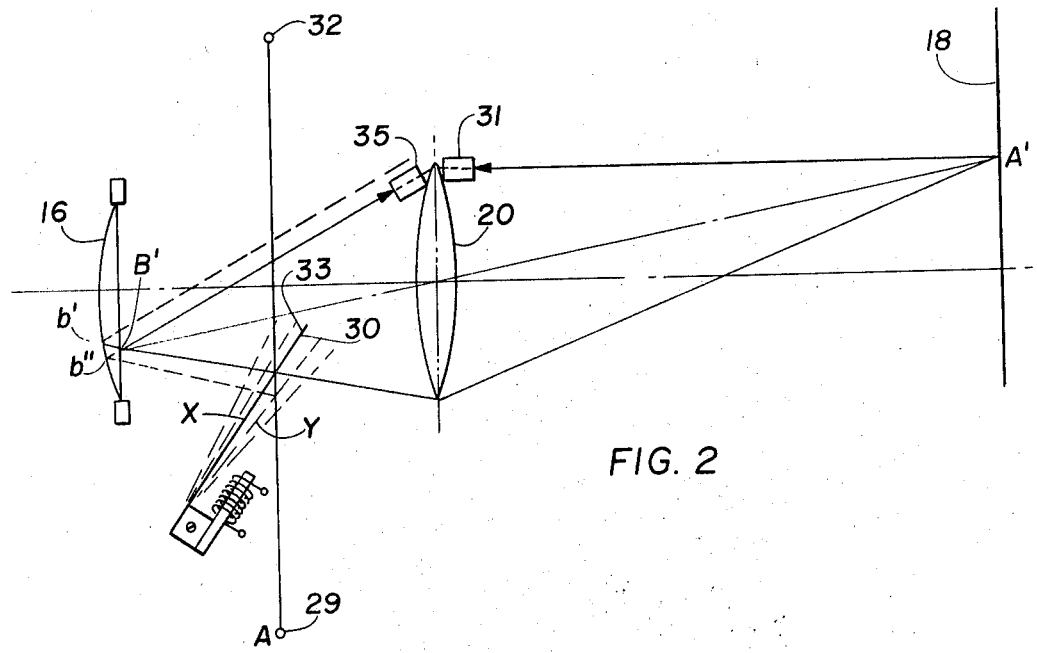
FIG. 2 is a diagrammatic view of the system showing an out-of-focus condition caused by buckling of the slide transparency.
Figure 3:
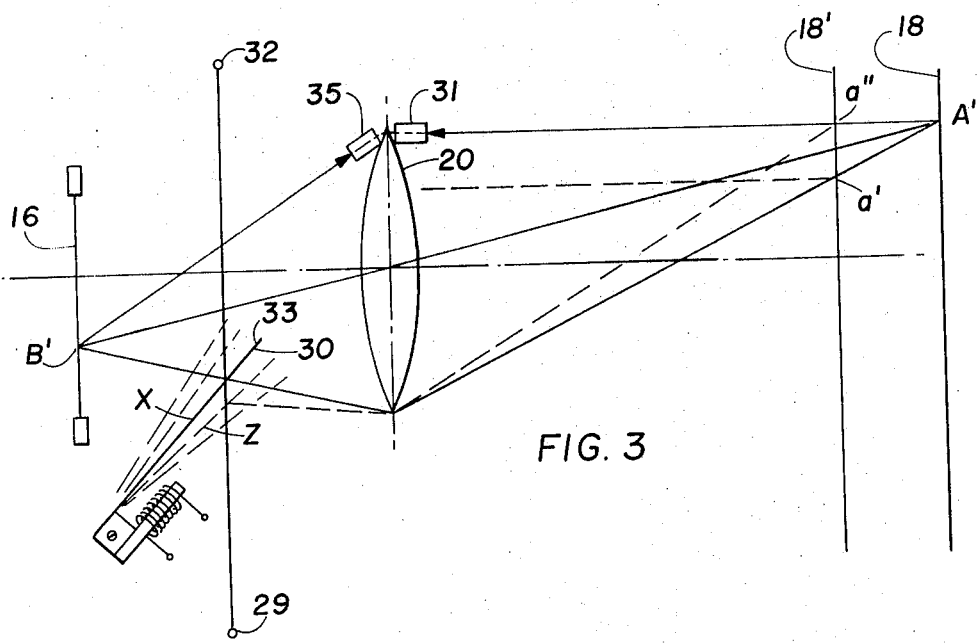
FIG. 3 is a diagrammatic view of the system showing another out-of-focus condition caused by decreasing the distance between the projector and slide.
Figure 4:
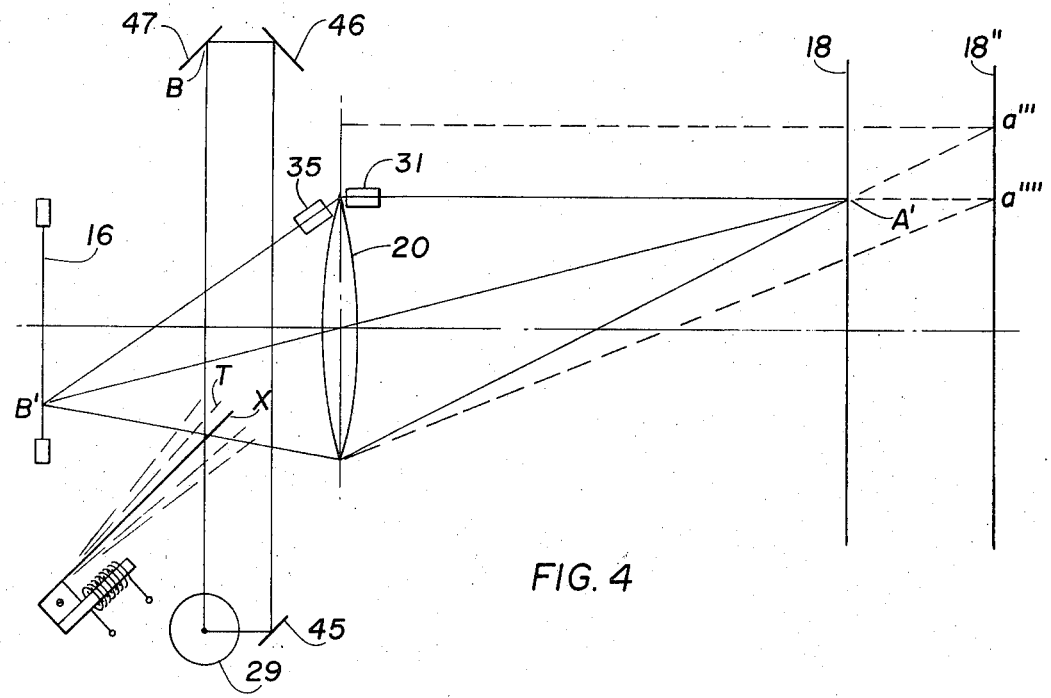
FIG. 4 is a diagrammatic view of the system showing still another out-of-focus condition caused by increasing the distance between the projector and screen.

The position of the detection cells 31 and 35 are such that in the focussed condition as shown in FIG. 1 they receive light reflected only from points A' and B', respectively, rather than of the entire pattern focussed on the screen and the transparency during each oscillation of mirrors 30 and 33. The balance of the reflected light from patterns A'' and B'' is scattered and does not reach either of the detection cells. It can be seen that if the screen 18 or the sleeve 24 holding the objective lens 20 and the photocells is moved, photocell 31 will receive wave energy reflected not from point A', but from a different point on the screen pattern A''. Likewise, if the slide 16 is displaced or buckled within gate 15 or if sleeve 24 is moved, photocell 35 will receive reflected light from a different point on the transparency pattern B''. Accordingly, at the precise instant when the reflected beam from either the screen 18 or the slide 16 reaches the respective photocell 31 or 35 after movement of either the transparency, the objective lens or the screen, the mirrors 30 and 33 must necessarily be in an angular position different from that prior to the movement of one of the above-mentioned components. In this manner, the light reflected from the slide 16 or the screen 18 after one of such components is moved, will reach the photocell in its respective appraisal subsystem out of time phase with the light beam received by the photocell in the other appraisal subsystem. This occurs because there is a finite time differential between the angular position of the mirrors when the reflected light reaches the first photocell 31 from the screen 18 and the angular position of the mirrors when the reflected light reaches the second photocell 35 from the transparency 16. This phenomenon is explained in greater detail with respect to FIGS. 2, 3 and 4 illustrating various out-of-focus conditions which the system automatically overcomes. It should be noted that in selecting a vibration frequency for the mirrors the response time of the photocells must be taken into consideration to avoid confused signals which would cause malfunctioning of the system. A vibration frequency of 240 CPS has been found to yield satisfactory results, but as will be apparent to those skilled in the art other frequencies are also suitable.

Photocells 31 and 35 are connected to a control circuit 40 which is responsive to a time phase differential between the electrical pulses generated by photocells 31 and 35 and is adapted to produce a control signal representing such differential. The control signal is boosted by amplifier 41 and used to energize reversible motor 28. If the photocells 31 and 35 produce pulses which are out of time phase, representing an out-of-focus condition of the projector, the control circuit 30 will produce either a positive or negative control signal, during each vibrating cycle of the mirrors 30 and 33. These control signals are boosted by amplifier 41 to energize the motor 28 for either clockwise or counter-clockwise rotation, depending upon their polarity. Upon energization, motor 28 is operative to transport the objective lens 20 and the photocells 31 and 35 in either a forward (toward the screen) or reverse (toward the slide) direction along the optical axis of the projector to re-establish focus and reposition the light beams in the first and second appraisal subsystems, a manner such that the generated electrical pulses are in time phase with each other once again. In the focussed condition the pulses from both photocells reach the control circuit 40 simultaneously so that no control signal is produced. The particular details of the control circuit are described hereinafter with reference to FIG. 5.

In the embodiment shown the beams of light from the wave energy sources 29 and 32 are focussed on the screen 18 and the slide 16 at points displaced vertically from the optical axis 13 of the projector. The appraisal subsystems are arranged in this manner merely for convenience, since it enables the positioning of the photocell 31 and 35 in a suitable location in the projector. It also minimizes the number of reflecting surfaces that are required in order to direct the appraisal beams from the slide and screen to their respective photocells. As shown, photocell 31 in the first appraisal subsystem is positioned to receive reflected light from the screen 18 along a path which is parallel to the optical axis 13. To insure that the two photocells 31 and 35 will receive reflected light at precisely the same instant when the projector is in the focussed condition, photocell 35 is disposed at an angle $\theta$ with respect to the nodal plane N of the objective lens 20. This angle can be calculated in accordance with the following formula and in this manner the automatic focussing system of the invention can be adapted for use in various types and sizes of projectors.

$$\theta = \tan^{-1} f/h,$$

wherein $h$ equals the distance that photocell 31 is displaced from the optical axis 13, and $f$ equals the focal length of the objective lens 20. It should also be noted that in some projectors it may also be desirable to position the various components of the first and second appraisal subsystems so that points A' and B' on the screen and slide, respectively, are displaced both vertically and horizontally with respect to the optical axis. This is a matter of convenience and suitable arrangements for accomplishing this will be well known to those skilled in the art.

As mentioned hereinabove, the light focussed on the screen 18 and the slide 16 from the two sources of wave energy form straight line or bar like patterns thereon. Because of the high frequency of the oscillating mirrors 30 and 33 these patterns are barely visible to a person viewing the image of slide 16 projected on the screen, and in most cases present no interruption or disruption of the projected image. However, to completely avoid any problems of this nature, suitable filters can be associated with light sources 29 and 32 so that energy of a wave length outside the visual spectrum can be focussed on the screen and on the slide. In such cases the photocells 31 and 35 can be selected to be responsive only to the wave energy of the particular wave length produced by the light sources.

When both appraisal subsystems as described above are in a stable condition or a condition of equilibrium wherein the electrical pulses generated by photocells 31 and 35 are in time phase with each other the image contained on slide 16 will be in perfect focus upon screen 18. Similarly, all of the wave energy emitted from point A and focussed by objective lens 20 will converge at point A' on the screen and all of the wave energy emitted from point B and focussed by lens 34 will converge at point B' on the slide. This stable condition or condition of equilibrium wherein the slide image is perfectly focussed on the screen may be expressed by the well known optical formula:

$$1/D + 1/d = 1/f,$$

wherein $D$ is the distance between the lens 20 and screen 18, $d$ is the distance between the lens 20 and point B' and f is the focal length of lens 20. At this time it should be mentioned that in the schematic drawings of FIGS. 1 through 4 these distances are not shown in proportion to one another.

In operation, FIG. 1 illustrates both appraisal subsystems in a stable condition with the transparency 16 in perfect focus on screen 18. Now assume that the slide has buckled or popped as shown in FIG. 2 out of the plane defined by the slide positioning elements 15. Let us also assume that X represents the position of mirrors 30 and 33 in the focused condition prior to the popping of slide 16. In that condition as mentioned above, light from source 32 will be focussed at point B' on slide 16 and light from source 29 will be focussed at point A' on screen 18. When the slide 16 pops into the position shown in FIG. 2, light from source 32 reflected by mirror 33 when the mirror is in position X will strike slide 16 at $b'$. However, in this position as shown by the dotted line the light reflected from the buckled slide 16 will not be focused upon photocell 35. Instead, light from point $b''$ will be received by photocell 35, but this will not occur until mirror 33 moves to position Y shown in FIG. 2. Since there is a finite time differential between position X and position Y of mirrors 30 and 33, light from source 29 will be reflected by mirror 30 to screen 18 at point A' and will be received by photocell 31 prior to the receipt by photocell 35 of the light reflected by slide 16 at point $b''$. In other words, when the slide has buckled into the position shown, photocell 31 will generate an electrical pulse which preceeds in time the electrical pulse generated by photocell 35 for each cycle of the oscillating mirrors 30 and 33. The two signals will be received by the control circuit 40 and acted upon in a manner such that a control signal will be generated representing the time phase differential between the two pulses. The control signal is boosted by the amplifying circuit 41 to produce a current which energizes motor 28 to rotate pinion 26 via shaft 27, in a direction which causes axial movement of the lens 20 and the two photocells 31 and 35 toward slide 16 until the slide image is refocussed upon the screen and the photocell pulses are in time phase with each other.

Referring to FIG. 3, assume that during the previous use of the slide projector, the objective lens 20 was positioned for achieving focus with the screen 18 located relative to the projector as indicated, and that during the next use of the slide projector there is a different screen to projector distance represented by the screen being in the position designated 18'. In this condition the wave energy in the first appraisal subsystem reflected by mirror 30 in position X will not converge at point A' but rather at point $a'$ thereby resulting in an out of focus condition. Furthermore, the light reflected at point $a'$ is not focussed upon photocell 31. Accordingly, it is not until mirror 30 reaches position Z that a light beam from source 29 is reflected from a point on the screen, designated $a''$, to photocell 31. As in the previous example described with reference to FIG. 2, since there is a finite time differential between positions X and Z of the mirrors 30 and 33, the pulses generated by photocells 31 and 35 will be out of time phase with each other and will result in a control signal being generated which energizes motor 28 so as to axially move the lens 20 and photocells 31 and 35 along the optical axis of the projector in a direction toward the screen, so as to re-establish the focussed condition of the projected image and once again place the generated pulses in the time phase with each other so as to deactivate the servo motor 28.

FIG. 4 diagramatically illustrates the condition opposite from that described with reference to FIG. 3. In this condition, the lens 20 has been positioned for achieving focus with the screen 18 positioned relative to the projector as illustrated. A new screen to projector distance is represented by the screen located as indicated at 18''. In this position wave energy from source 29 now converges at point $a'''$ rather than A', so that the light reflected therefrom does not focus upon photocell 31. In fact in order to reach photocell 31 to produce an electrical pulse, a light beam from source 29 must converge on screen 18'' at point $a''''$. For this to occur however, light from source 29 must be reflected by the oscillating mirror when it is the position designated T rather than X which represents the equilibrium position prior to moving the screen. Point B' on slide 16 represents the focussed beam of light in the second appraisal subsystem when the oscillating mirror is in position X, whereas point $a''''$ on screen 18'' represents position T of the mirror. Accordingly, there will be a differential in the time between the pulse generated by photocell 31 activated by the reflection from point $a''''$ on screen 18'' and the pulse generated by photocell 35 upon its receipt of the light reflected from point B' on slide 16. The control circuit when activated by these differential signals produces a control signal operative to energize motor 28 to move lens 20 and the two photocells 31 and 35 toward slide 16 so as to reposition the components to re-establish focus on the screen and synchronize the pulses generated by the photocells.

FIG. 4 also illustrates another embodiment of the invention whereby a single source of light 29 can be utilized to provide appraisal beams for each of the appraisal subsystems. This is accomplished simply by utilizing three mirrors 45, 46, and 47. Light from bulb 29 is reflected from mirror 45 to mirror 46 and from there to mirror 47 which is positioned in the same plane as bulb 29 so that the point where it reflects the light received from mirror 46 to the oscillating mirror corresponds to point B in the previously described embodiment. It will be apparent that the positions of the bulb 29 and of any of the mirrors 45, 46, and 47 could be interchanged and that the system would function in the same manner as described above.

Figure 5:
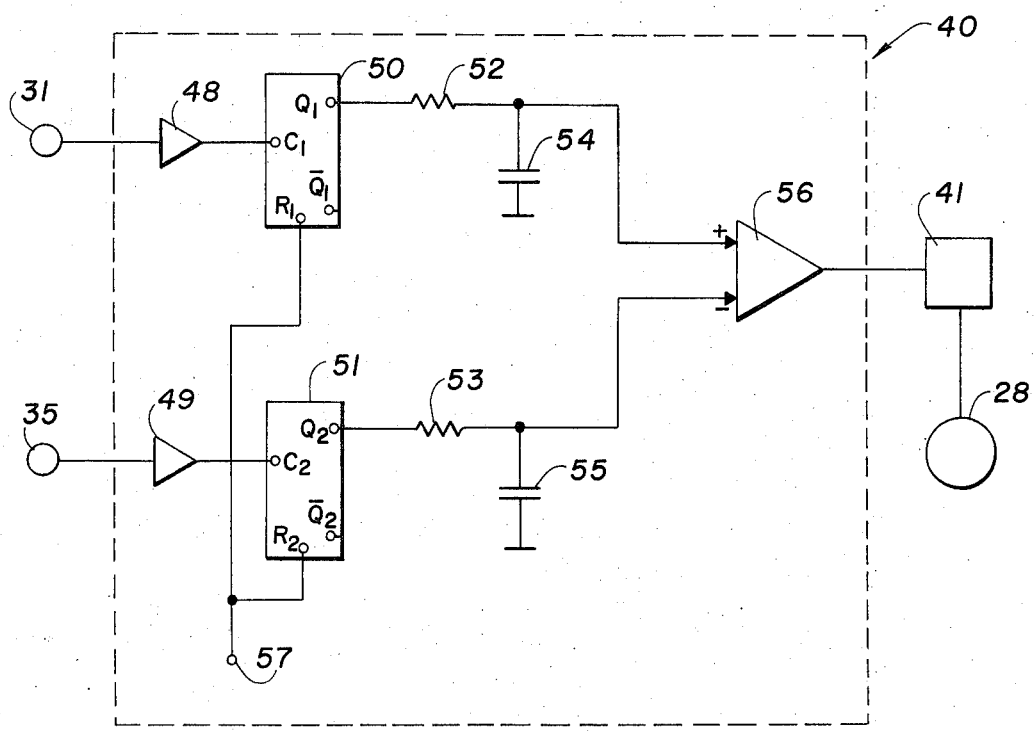
FIG. 5 is a schematic diagram of the control circuit.

The control circuit 40 is shown in block diagram form in FIG. 5. The circuit comprises a first amplifier 48 to boost the pulses generated by photocell 31, a second amplifier 49 to boost the pulses generated by photocell 35, a first bi-stable oscillator (flip-flop) 50 connected at point $C_1$ to amplifier 48 and a second flip-flop 51 connected at point $C_2$ to amplifier 49. The output $Q_1$ of flip-flop 50 is connected via a first RC network, comprising resistor 52 and capacitor 54, to differential amplifier 56. Similarly, the output $Q_2$ of flip-flop 51 is also connected by means of a second RC network, containing resistor 53 and capacitor 55, to differential amplifier 56. The control signal produced by differential amplifier 56 is boosted by amplifier 41 servo motor 28. A synchronizing pulse generated by means of line source 56 is introduced to both flip-flops 50 and 51 at points $R_1$ and $R_2$, respectively.

In operation, the flip-flops 50 and 51 change their states from $Q_1$ (on) to $\bar{Q}_1$ (off) and from $Q_2$ (on) to $\bar{Q}_2$ (off) respectively, when maximum pulses are received at $C_1$ and $C_2$, corresponding to the photocells 31 and 32 being illuminated. Since one complete cycle of the vibrating mirrors will produce two pulses (at $C_1$ and $C_2$), it is necessary to select the correct pulse generated by either photocell 31 or photocell 35, so that both flip-flops will change states in the same direction (either to on or off). Of course, this occurs simultaneously only when the photocells are generating pulses in time phase with each other, representing the focussed condition. Therefore, to synchronize the two flip-flops, pulses are applied at $R_1$ and $R_2$. Since the $R_1$ and $R_2$ pulses are derived from a line source, they are automatically in synchronization with the vibrating mirror, which is operated from the same source. Normally the $R_1$ and $R_2$ pulses do not take part in the circuit function, since they coincide with the off time of the flip-flops, but when the flip-flops are out of phase, they will automatically be reset to the proper timing by the next $R_1$ and $R_2$ pulse. The $Q_1$ and $Q_2$ outputs of the flip-flops are integrated by the respective RC networks, and are compared by the differential amplifier 56. The DC level of the $Q_1$ and $Q_2$ outputs is determined by the on/off time ratio of the flip-flops. In this manner, the control signal output of the differential amplifier will be some positive or negative value if the on/off ratios of each flip-flop are not equal. The control signal is applied to the motor 28 via amplifier 41 so that the motor will reposition the objective lens to focus the image on the screen and reposition the photocells 31 and 35 so as to equalize the two on/off time ratios.

The embodiments described herein are intended for illustration and in no way limit the scope of the invention. Other embodiments, configurations and variations of the automatic focusing system of the invention will be apparent to those skilled in the art.

What is claimed is:

1. A projection device of the type including an element for positioning a transparency on an optical axis defined by a movable objective lens mounted between such element and a screen remote from the device including, a system for automatically focusing a transparency image on said screen comprising;
   a. a first appraisal subsystem to sense variations in the distance between the objective lens and the screen including;
      1. a first source of wave energy,
      2. means for directing a beam of wave energy from said first source to the projection screen, and
      3. first detection means adapted to receive wave energy reflected from the screen and responsive thereto to generate a first electircal pulse;
   b. a second appraisal subsystem to sense buckling of the transparency including:
      1. a second source of wave energy,
      2. a means for directing a beam of wave energy from the second source to the transparency, and
      3. detection means positioned to receive wave energy reflected from the transparency and responsive thereto to generate a second electrical pulse; said first and second electrical pulses being in time phase with each other when the transparency image is focussed upon said screen and out of time phase with each other upon displacement of either the screen or the transparency as measured along the optical axis;
   c. control circuit means connected to said first and second detection means and adapted to produce a control signal representing the time phase differential between said first and second electrical pulses; and
   d. motive means operated by the control circuit means and responsive to the control signals to axially move the objective lens to establish focus of the screen image and bring the pulses generated by the two detection means into time phase.

2. The automatic focusing system according to claim 1, wherein the wave energy directing means in both the first and second appraisal subsystem cnprises a two-sided reflector which is interposed between the first and second sources of wave energy in a manner such that wave energy from the first source is reflected by one side of the reflector to the screen, and wave energy from the second source is reflected by the second side of the reflector to the transparency.

3. The automatic focusing system according to claim 2, wherein the means for directing wave energy in the first appraisal subsystem includes the objective lens.

4. The automatic focusing system according to claim 2, further comprising oscillating means associated with said two-sided reflector to vibrate the reflector at a high frequency to cyclically change its angle with respect to the two sources of wave energy.

5. The automatic focusing system according to claim 4, in which the two sources of wave energy are coplanar, and said two-sided reflector intersects such plane, so that the beams reflected from both sides thereof at any given instant are in axial alignment with each other regardless of the angular position of the reflector with respect to the two wave energy sources.

6. The automatic focusing system according to claim 1, wherein the first and second detection means are mounted for movement together with the objective lens along the optical axis of the projector.

7. The automatic focusing system according to claim 1, wherein the second source of wave energy is derived from the first source by means of reflecting surfaces disposed within the projector and adapted to direct a beam of wave energy from the first source to a position in which the beam directing means in the second appraisal subsystem directs said beam to the transparency.

8. The automatic focusing system according to claim 1, wherein the beams of wave energy directed to the screen and the transparency are displaced with respect to the optional axis of the projector.

9. In a projection device of the type including an element for positioning a transparency on an optical axis defined by a movable objective lens mounted between such element and a screen remote from this device, a system for automatically focusing a transparency image on said screen comprising;
   a. a source for emanating wave energy;
   b. first detection means adapted to receive wave energy emanating from said source and responsive thereto to generate a first electrical pulse
   c. second detection means adapted to receive wave energy emanating from said source and responsive thereto to generate a second electrical pulse;
   d. means for directing a beam of wave energy from said source to said first detection means along paths which are defined in part by said wave energy being reflected from said screen, and for directing a second beam of wave energy from said source to said second detection means along paths which are defined in part by said wave energy being reflected by said transparency, such that displacement of either the screen or the transparency as measured along the optical axis will cause the beams received by the first and second detection means to be out of time phase with respect to each other;
   e. a control circuit means connected to said first and second detection means and adapted to produce a control signal representing the time phase differential between the first and second electrical pulses; and
   f. motive means operated by the control circuit in response to the control signal to axially move the objective lens to establish focus of the screen image and bring the pulses from the two detection means into time phase.

10. The automatic focusing system according to claim 9, wherein the beam directing means comprises a two-sided reflector disposed in the projector in a manner so that it receives wave energy from said source on both sides thereof.

11. The automatic focusing system according to claim 10, further comprising oscillating means associated with said two-sided reflector to vibrate said reflector at a high frequency so as to cyclically change its angle with respect to the two beams of wave energy emanating from said source.

12. The automatic focusing system according to claim 9, wherein said circuit means includes a bi-stable multivibrator.

13. The automatic focusing system according to claim 9, wherein the motive means includes a reversible electric servo motor operatively connected to the objective lens to move same along the optical axis of the projector.

14. The automatic focusing system according to claim 13, wherein the first and second detection means are mounted in the projector for movement with the objective lens along the optical axis.

15. A method for automatically positioning an objective lens on the optical axis of a projection device to establish focusing of transparency image on a remote projection screen comprising the steps of:
 a. directing a beam of wave energy from a wave energy source to a first detection means along paths which are defined in part by said wave energy being reflected from said screen;
 b. directing a second beam of wave energy from a wave energy source to a second detection means along paths which are defined in part by said wave energy beam reflected from said transparency;
 c. generating a first electrical pulse by said first detection means upon its illumination by the beam of wave energy reflected by said screen;
 d. generating a second electrical pulse by said second detection means upon its illumination by the beam of wave energy reflected from said transparency;
 e. electronically comparing said first and second electrical pulses to determine whether they are in time phase with each other, which occurs upon the simultaneous illumination of both the first and second detection means, and represents the focussed condition of the transparency on the screen;
 f. generating a control signal representing the time differential between said first and second electrical pulses; and
 g. driving reversible motive means with said control signal to move the objective lens of the projector in either a forward or reverse direction along the optical axis thereof, so as to establish a focussed condition of the image upon the screen and bring said first and second electrical pulses into time phase with each other.

16. The method according to claim 15 in which the steps for directing the two beams of wave energy include oscillating a two-sided mirror between said beams and the screen and the transparency, respectively.

17. The method according to claim 15, in which the first and second detection means are moved together with the objective lens along the optical axis.

* * * * *